(12) United States Patent
Townsend et al.

(10) Patent No.: US 8,379,123 B2
(45) Date of Patent: Feb. 19, 2013

(54) SYSTEM AND METHOD OF CAPTURING LOW-LIGHT IMAGES ON A MOBILE DEVICE

(75) Inventors: Graham Charles Townsend, Menlo Park, CA (US); Brett Foster, Kitchener (CA)

(73) Assignee: Research In Motion Limited, Waterloo (CA)

( * ) Notice: Subject to any disclaimer, the term of this patent is extended or adjusted under 35 U.S.C. 154(b) by 82 days.

(21) Appl. No.: 12/966,357

(22) Filed: Dec. 13, 2010

(65) Prior Publication Data

US 2012/0147243 A1 Jun. 14, 2012

(51) Int. Cl.
*H04N 5/335* (2006.01)
(52) U.S. Cl. ....................................................... 348/294
(58) Field of Classification Search .................... 348/294
See application file for complete search history.

(56) References Cited

U.S. PATENT DOCUMENTS

| | | | |
|---|---|---|---|
| 4,823,186 A | 4/1989 | Muramatsu | |
| 5,910,816 A | 6/1999 | Fontenot et al. | |
| 6,292,212 B1 * | 9/2001 | Zigadlo et al. | 348/33 |
| 7,053,928 B1 | 5/2006 | Connors et al. | |
| 7,688,368 B2 | 3/2010 | Kijima et al. | |
| 2005/0029456 A1 * | 2/2005 | Eggers et al. | 250/339.02 |
| 2009/0251562 A1 | 10/2009 | Ikeda | |
| 2009/0302219 A1 | 12/2009 | Johnson et al. | |
| 2010/0289885 A1 * | 11/2010 | Lu et al. | 348/61 |

FOREIGN PATENT DOCUMENTS

DE 10220825 7/2003

OTHER PUBLICATIONS

Extended European Search mailed May 16, 2011. In corresponding application No. 10194791.9.
IVR—Images and Visual Representation Group. Near-Infrared Imaging http://ivrgwww.epfl.ch/research/topics/nir.html. Retrieved on Apr. 9, 2012.
Dual-band camera registers visible and near-IR images. http://www.princetonlightwave.com/files/VisionEastPaper_PrincetonLightwave.pdf. Retrieved on Apr. 9, 2012.
The Sony DSC-F717 Digital Camera. http://reviews.cnet.com/digital-cameras/sony-cyber-shot-dsc/1707-65017-31555301.html. Published on Oct. 12, 2005 and retrieved on Apr. 9, 2012.
Dual CCD Camera allowing capture of dual wavelength. http://sales.hamannatsu.com/index.php?id=13226252. Retrieved on Apr. 9, 2012.
Examination report mailed Jun. 20, 2012, in corresponding European patent application No. 10194791.9.

* cited by examiner

*Primary Examiner* — James Hannett
(74) *Attorney, Agent, or Firm* — Novak Druce + Quigg LLP (57) ABSTRACT

A system and method of capturing low-light images on a mobile device include a camera module, an image sensor, an infrared filter, and a visible light filter. The image sensor can detect a color spectrum of ambient light passed through a lens of the camera module. The visible light filter can cover a first portion of the image sensor, and the infrared filter can cover a second portion of the image sensor. A processor can be coupled to the image sensor to receive visible light data and infrared data. Visible light data can be formed from ambient light passed through the visible light filter and image sensor. Infrared data can formed from ambient light passed through the infrared filter and the image sensor. The visible light data and the infrared data are combined to form a low-light image data having enhanced brightness while maintaining color accuracy.

14 Claims, 8 Drawing Sheets

SYSTEM AND METHOD OF CAPTURING LOW-LIGHT IMAGES ON A MOBILE DEVICE

FIELD OF TECHNOLOGY

The subject matter herein generally relates to mobile devices, and more specifically relates to a system and method of capturing low-light images on a mobile device.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, handheld messaging devices, personal digital assistants, and handheld computers.

Mobile devices allow users to have an integrated device which can perform a variety of different tasks. For example, a mobile device can be enabled for each of or some of the following functions: voice transmission (cell phones), text transmission (pagers and PDAs), sending and receiving data for viewing of Internet websites, and multi-media messages. Additionally, mobile devices can include one or more applications such as a camera application for capturing photographs or videos.

BRIEF DESCRIPTION OF THE DRAWINGS

Implementations of the present technology will now be described, by way of example only, with reference to the attached figures, wherein.

DETAILED DESCRIPTION

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

As mobile devices are compact, real estate within the mobile device is limited and compromises need to be made as to what components to add based on the desired needs functions of the mobile device. With regard to mobile devices having cameras, the cameras typically have an infrared cut off filter to allow the camera colors correctly. However, the filter removes a significant percentage of light energy available in the scene which is being captured by the camera, which increases the minimum light level required to generate an image. As a result, images captured on mobile device cameras tend to be darker. Additionally, as flashes on mobile device cameras require additional energy to power the flashes, lower-powered flashes are implemented, thereby resulting in a darker resultant image. As mobile devices having cameras require a higher minimum light level to generate an acceptable image, mobile device cameras are typically insufficient to capture night time images, indoor images, and other low-light images. Accordingly, the present disclosure provides a system and method of capturing low-light images on a mobile device.

The system and method of capturing low-light images on a mobile device can include a camera module, an image sensor for detecting a color spectrum of ambient light, an infrared filter and a visible light filter coupled to the image sensor, a processing module adapted to receive color spectrum data from ambient light filtered by the infrared filter and visible light filter and passed through the image sensor, and a display coupled to the processing module. In at least one implementation, the infrared filter can cover a first portion of the image sensor, and the visible light filter can cover a second portion or a remainder portion of the image sensor. When ambient light passes through the camera module and is directed towards the image sensor, the ambient light passes through the infrared filter and the visible light filter resulting in color spectrum data that comprises infrared data and visible light data. In other words, the resulting image comprises both an infrared image and a visible light image, thereby resulting in an image with enhanced low-light performance without negatively affecting the camera's ability to sense and capture colors. With the system and method of capturing low-light images on a mobile device disclosed herein, light energy is maximized while maintaining color accuracy resulting in images having enhanced brightness.

Figure 1:
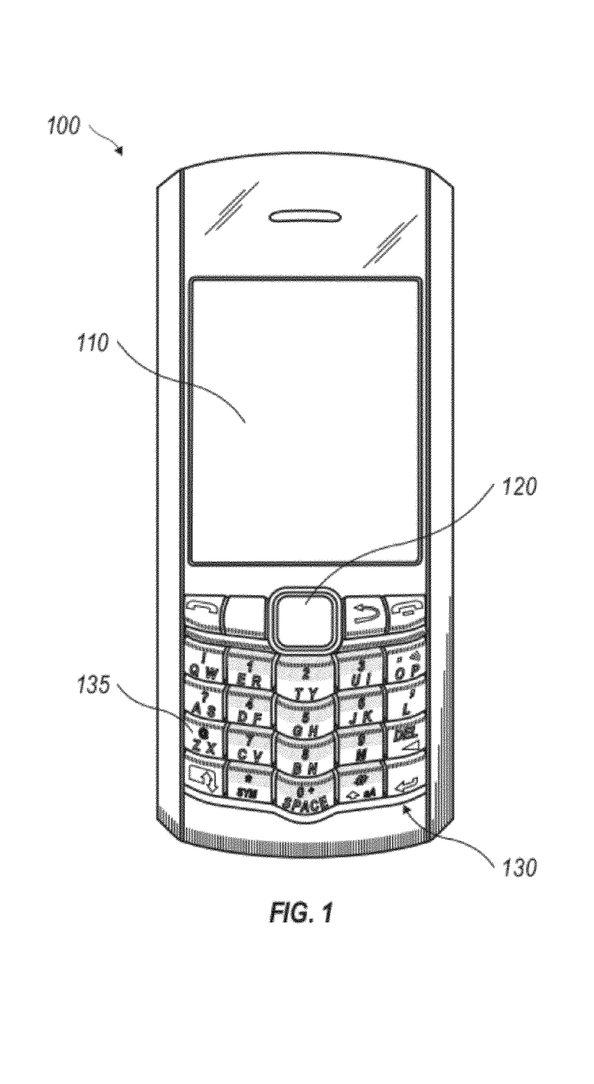
FIG. 1 is a view of the front of an exemplary mobile device configured for capturing low-light images in accordance with an exemplary implementation of the present technology.

FIG. 1 illustrates a front view of an exemplary mobile device adapted to capture low-light images. The illustrated mobile device 100 is a cellular phone but can also be a smart phone, a netbook, an electronic tablet, an electronic pad, a personal digital assistant (PDA), or any other similar electronic device which includes a display, a processor communicatively coupled to the display, and a camera module. The mobile device 100 includes a display screen 110 on which photos, videos, user interfaces (UIs), or any other graphical item can be displayed. The display screen 110 can be a liquid crystal display (LCD), a light emitting diode (LED) display, an active matrix organic light emitting diode display (AMOLED), a nanocrystal display, a nanotube display, a touch-sensitive display screen, or any other display screen on which graphical or visual items can be displayed. Below the display screen 110 can be a navigation tool 120, such as an optical trackpad as illustrated in FIG. 1. However, one of ordinary skill in the art will appreciate that the navigation tool 120 can also be an optical trackball, a trackball, a jog dial, an omnidirectional joystick, or any other navigation tool at which inputs can be received and output to alter the display screen 110. In FIG. 1, a keyboard 130 having a plurality of keys 135 can be positioned below the navigation tool 120. In the illustrated implementation, each key 135 of the keyboard 130 bears at least one of an alphabetic, numeric, symbolic, or functional indicia. The indicia signify the data to be input upon actuation of the key 135 bearing the indicia. In FIG. 1, the keyboard 130 is a reduced keyboard, where at least one key 135 is associated with more than one alphabetic indicia. In an alternative implementation, the keyboard 130 can be a full keyboard having each key 135 associated with an alphabetic indicia. The indicia on the keys 135 of the keyboard 130 in FIG. 1 are arranged in a QWERTY keyboard layout; however, one of ordinary skill in the art will appreciate that the keyboard layout can be an AZERTY layout, a QWERTZ layout, a DVORAK layout, a pinyin Chinese keyboard layout, or any other keyboard layout that allows a user to input alphabetic, numeric, symbolic, and functional indicia. The keys 135 can be press-actuable keys, touch-sensitive keys, capacitive keys, or any other similar key that allows for the input of data to a processor of the mobile device 100 upon user-engagement with the key 135.

Figure 2:
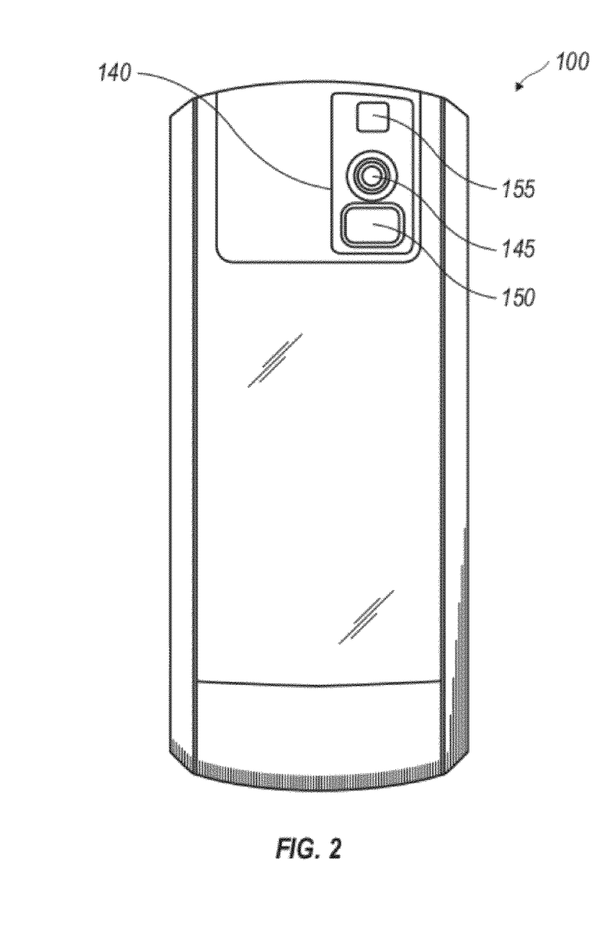
FIG. 2 is a view of the rear side of the exemplary mobile device illustrated in FIG. 1.

FIG. 2 is a rear view of the exemplary mobile device 100 illustrated in FIG. 1. A camera module 140 can be on the rear side of the mobile device 100. In at least the implementation illustrated in FIG. 2, the camera module 140 can include a camera lens 145 coupled to an image sensor (not shown), a flash module 155, and a mirrored surface 150. Images sensed by the camera lens 145 can be captured as photographs or videos using a camera application executed by a processor (not shown) communicatively coupled to the camera module 140. The flash module 155 can provide light to assist in exposing the object or objects to be captured as a photograph or video by the camera lens. In other implementations, the configuration of the flash module 155, camera lens 145, and mirrored surface 150 can be located in different positions relative to one another as well as different positions on the backside of the mobile device 100. In at least one implementation, the flash module 155, camera lens 145 and mirror 150 can be located on the front side of the mobile device 100.

Figure 3:
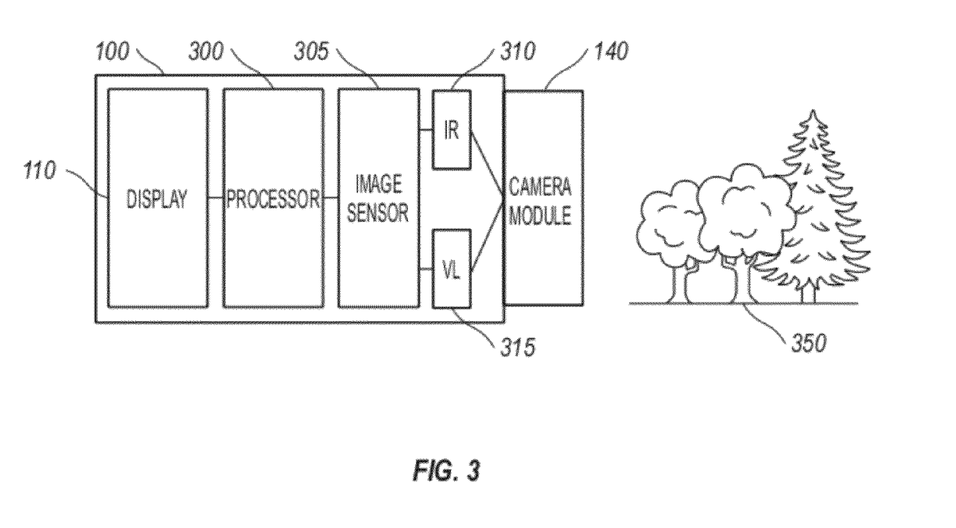
FIG. 3 is a block diagram representing the interaction between a processor and a an image sensor adapted to capture a low-light image in accordance with an exemplary implementation of the present technology.

FIG. 3 is a block diagram of a mobile device 100 adapted to capture low-light images. The mobile device 100 includes a camera module 140 comprising a camera lens (not pictured) for capturing an optical image of a scene 350. The camera module 140 is coupled to an image sensor 305 adapted to convert the optical image captured by the camera module 140 into an electrical signal processed by the processor 300 or processing module. The image sensor 305 can be a charge-coupled device (CCD), complementary metal-oxide-semiconductor (CMOS), a hybrid CCD-CMOS image sensor, or any other sensor adapted to convert an optical image to an electrical signal. In FIG. 3, an infrared filter 310 and a visible light filter 315 are positioned between the camera module 140 and the image sensor 305 to filter the ambient light passing through the camera module 140. The infrared filter 310 lets infrared (IR) light pass through to the image sensor 100 but blocks all or most of the visible light spectrum of a scene or image. For example, the infrared filter 310 allows light wavelengths from 700 nm-900 nm of the ambient light to pass through the camera lens of the camera module 140 through to the image sensor. The visible light filter 315 allows visible light to pass through to the image sensor 300. For example, the visible light filter 315 allows light wavelengths from 400 nm-700 nm of the ambient light passing through the camera lens of the camera module 140 to pass through to the image sensor 300. In at least one implementation, the visible light filter 315 can be adapted to filter light wavelengths corresponding to at least one of red, blue, green, and yellow colors of the light spectrum.

As ambient light passes through the camera module 140, the ambient light is filtered through the infrared filter 310 and the visible light filter 315 and passes through to the image sensor 305. The filtered ambient light passed through to the image sensor 305 results in a color spectrum data having both visible light data, that is, image data filtered through the visible light filter 315, and infrared data, that is, image data filtered through the infrared filter 310. The color spectrum data from the image sensor 305 is processed by the processor 300 as an electrical signal which can be displayed on the display 110 of the mobile device 100. As the image displayed on the display 110 comprises both infrared data and visible light data, the image has an enhanced brightness (for example, from the infrared data) while maintaining color accuracy (for example, from the visible light data).

Figure 4:
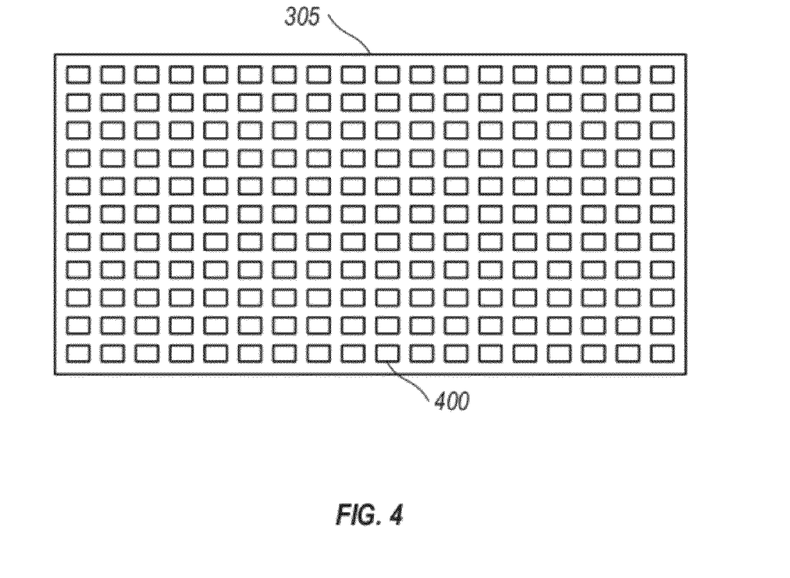
FIG. 4 is an exemplary image sensor of an exemplary implementation of the system of capturing low-light image on a mobile device.

FIG. 4 is a plan view of an exemplary image sensor in accordance with the present technology. In FIG. 4, the image sensor 305 comprises a plurality of photosensors 400. The photosensors 400 capable of sensing light or other electromagnetic energy. For example, the photosensors 400 can be photodetectors, charged coupled devices, photodiode light sensors, an optical sensor, an optical detector, or other sensors configured to detect light and to convert light into an electrical signal. The photosensors 400 can each be responsive to at least one of infrared light and visible light. For example, each photosensor 400 can be responsive to at least one of ambient light filtered through the infrared filter and ambient light filtered through the visible light filter. In at least one implementation, the photosensor 400 can be responsive to both infrared light and visible light depending on the filter placed between the camera lens and the photosensor 400. In another implementation, the photosensor 400 can be adjusted for sensitivity to visible light or infrared light. For example, quantum dots can be implemented with the photosensor 400 to adjust the photosensor's 400 sensitivity to visible light or infrared light, depending on the desired spectrum of light to be captured. In such an implementation utilizing quantum dots, the quantum dots can be deposited on a substrate (for example, a glass or plastic plate). In an alternative implementation, the quantum dots can be deposited directly on the image sensor (for example, on a silicon surface of an image sensor directly over the photosensors or light responders of the image sensor).

As illustrated in FIG. 4, the photosensors 400 are arranged in an array of columns and rows. Specifically, FIG. 4 illustrates an array of eleven rows and eighteen columns of photosensors; however, one of ordinary skill in the art will appreciate that any number of photosensors and any arrangement of photosensors can be implemented. For example, fewer columns and rows of photosensors can be implemented than as illustrated in FIG. 4. Additionally, a circular arrangement, triangular arrangement, or any other arrangement of photosensors can be implemented such that images captured by the camera module can be passed through to the image sensor 305 and processed as electrical sensors by the processor (shown in FIG. 3 as 100). While the illustrated photosensors 400 of FIG. 4 are shown as rectangular photosensors, one of ordinary skill in the art will appreciate that the photosensors 400 can be any other shape, such as circular.

Figure 5:
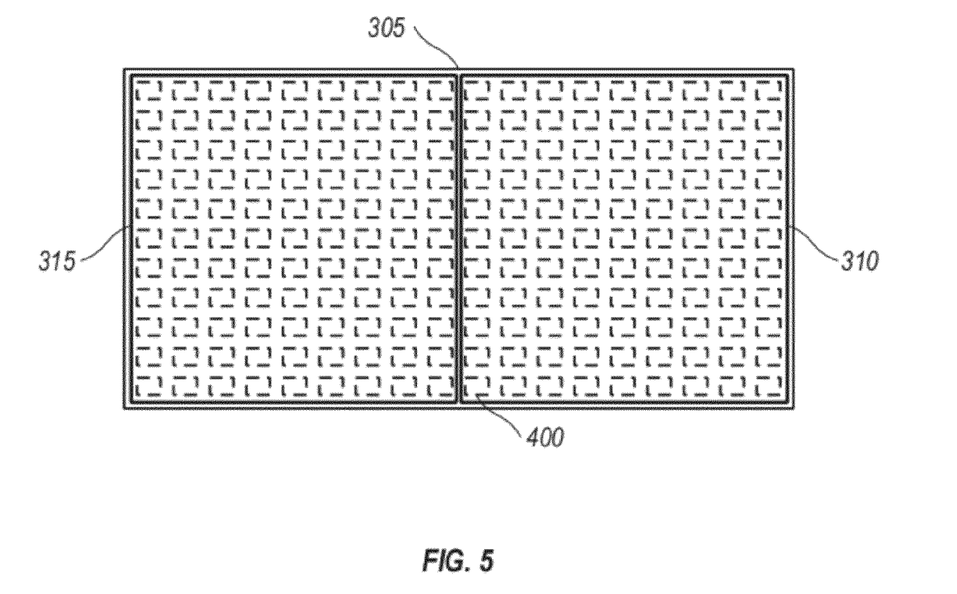
FIG. 5 is an exemplary image sensor covered by an infrared filter and a visible light filter in accordance with an exemplary implementation of the present technology.

FIG. 5 is an illustration of the image sensor 305 illustrated in FIG. 4 covered by an infrared filter 310 and a visible light filter 315. In FIG. 5, the infrared filter 310 is a square-shaped filter covering a first portion of the image sensor 305. For example, the infrared filter 310 can be a glass plate coated with a filtering material through which infrared wavelengths can pass. The visible light filter 315 is also a square-shaped filter covering a remainder or second portion of the image sensor 305. Similarly, the visible light filter 315 can be a glass plate covered with filtering material through which visible light wavelengths can pass. In another implementation, the infrared filter 310 and the visible light filter 315 can be triangular shaped filters (shown in FIG. 6), non-uniform-shaped-filters (shown in FIG. 7), or any other shaped-filters. In another implementation, the infrared filter 310 and the visible light filter 315 can be a plastic plate coated with filtering material (either infrared filtering material or visible light filtering material). For example, the plastic plate can be a resin plastic, acetate plastic, polyester, polycarbonate, or any other similar plastic on which filtering material can be layered. The filtering material can be layered on one or all sides of the plastic or glass plate. In other words, the glass or plastic plate serves as a substrate on which the filtering coating or filtering material is deposited. Also, the filtering material can be a single layer coated on the substrate or can be deposited in multiple layers on the substrate.

In at least one implementation, the filtering material can be a color gel or gelatin that is sensitive to the wavelengths corresponding to the desired color spectrum to be captured. For example, for an infrared filter, the color gel can be sensitive to the wavelengths corresponding to infrared light. In another implementation, the infrared filter 310 and the visible light filter 315 can be a color gel laminate sandwiched between a pair of glass plates or a pair of plastic plates. In an alternative implementation, the infrared filter 310 and the visible light filter 315 can be colored glass coated on both sides with the filtering material.

Figure 6:
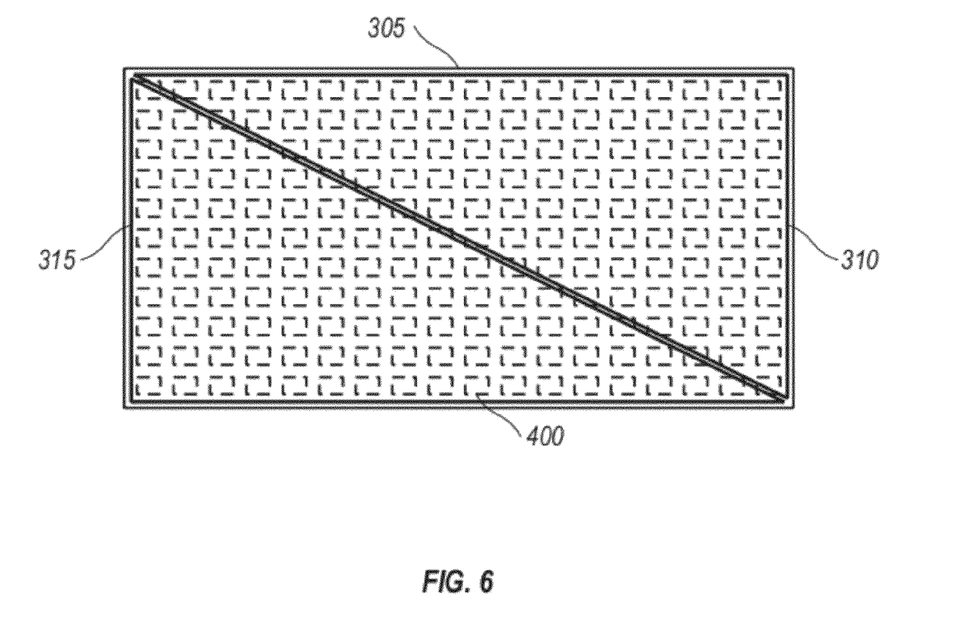
FIG. 6 is an alternative arrangement of an image sensor, an infrared filter and a visible light filter in accordance with an exemplary implementation of the present technology.
Figure 7:
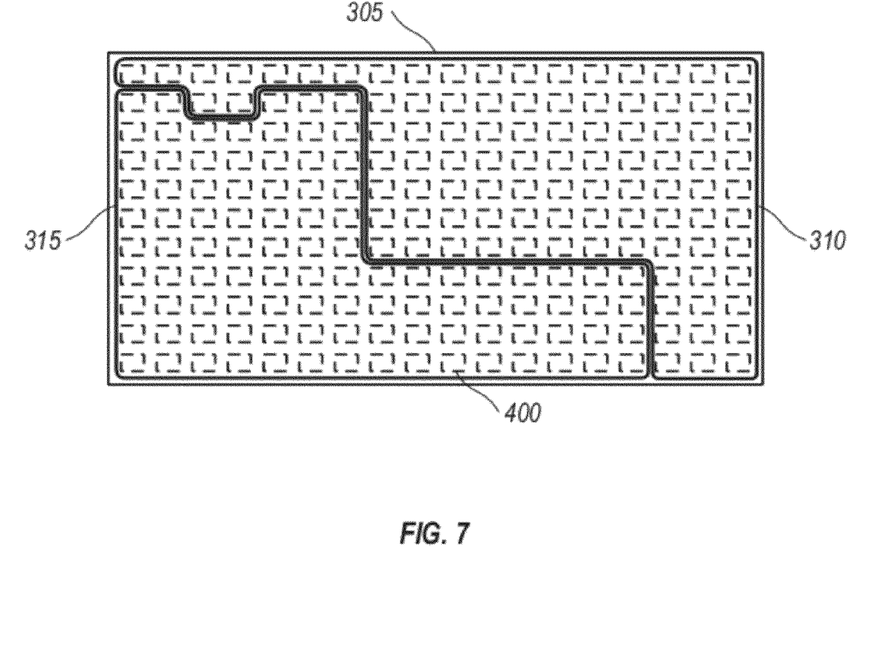
FIG. 7 is another alternative arrangement of an image sensor, an infrared filter and a visible light filter in accordance with an exemplary implementation of the present technology.

While FIGS. 5-7 illustrate the infrared filter 310 covering half of the image sensor 305 and the visible light filter covering the remaining half of the image sensor 305, those of ordinary skill in the art will appreciate that the infrared filter 310 can cover more or less than one-half of the image sensor 305, and the visible light filter 315 can cover the remaining portion of the image sensor 305 not covered by the infrared filter 310. For example, in at least one implementation, the infrared filter 310 can cover one-third of the image sensor 305, and the visible light filter can cover two-thirds of the image sensor 305. In another implementation, the infrared filter 310 can cover three-fifths of the image sensor 305, and the visible light filter 315 can cover two-fifths of the image sensor 305.

Figure 8:
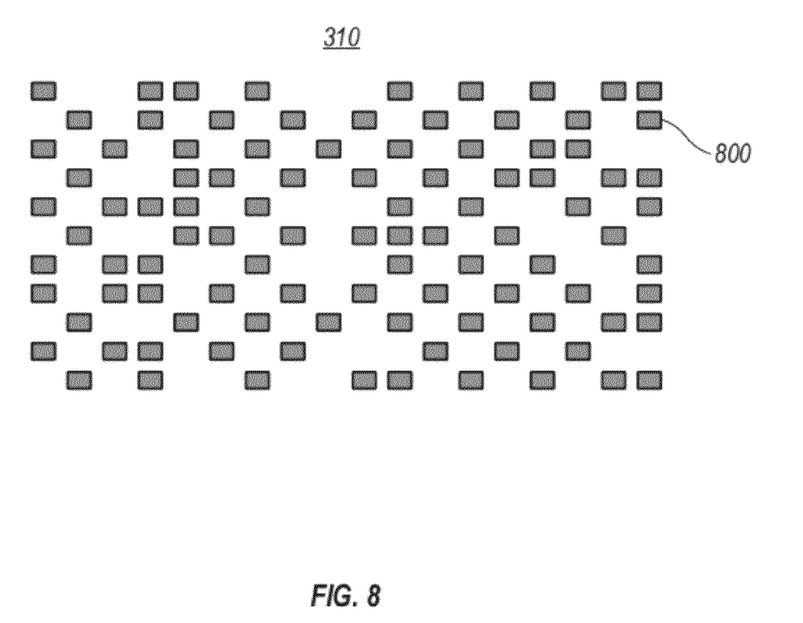
FIG. 8 is an infrared filter array in accordance with an exemplary implementation of the present technology.

FIG. 8 is an alternative implementation of an infrared filter 310 for the system and method of capturing low-light images on a mobile device. In FIG. 8, the infrared filter 310 comprises a plurality of infrared photosensor filters 800 arranged in an array corresponding to the array of photosensors of an image sensor, for example, the image sensor 305 illustrated in FIG. 4. The infrared photosensor filters 800 are shaped to correspond to the shapes and sizes of the photosensors of the image sensor, such that each infrared photosensor filter 800 can be placed over a single photosensor of the image sensor. As illustrated in FIG. 8, the infrared photosensor filters 800 can be arranged in an asymmetrical pattern or a random pattern. However, in other implementations, the infrared photosensor filters 800 can be arranged in a non-random pattern. In another implementation, the infrared photosensor filters 800 can be arranged in a symmetrical pattern.

Figure 9:
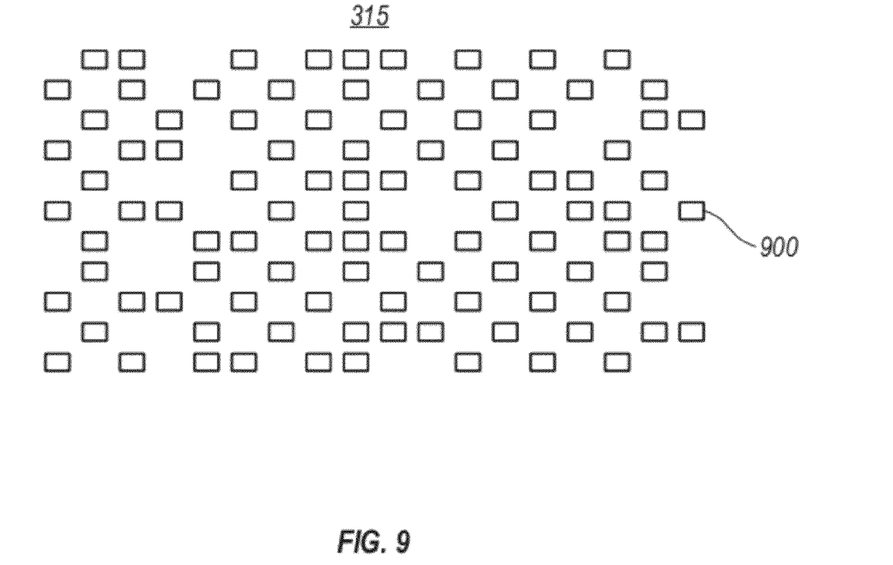
FIG. 9 is an visible light filter array in accordance with an exemplary implementation of the present technology.

FIG. 9 is an illustration of an implementation of a visible light filter 315 corresponding to the infrared filter 310 illustrated in FIG. 8. In FIG. 9, the visible light filter 315 comprises a plurality of visible light photosensor filters 900 arranged in an array corresponding to the array of infrared photosensor filters 310 illustrated in FIG. 8. Similar to FIG. 8, the visible light photosensor filters 900 correspond to the shapes and sizes of the photosensors of the image sensor, for example, the image sensor 305 illustrated in FIG. 4. Each visible light photosensor filter 900 can be placed over a single photosensor. As illustrated in FIG. 9, the visible light photosensors 900 can be arranged in an asymmetrical pattern or a random pattern. However, in other implementation, the visible light photosensor filters 900 can be arranged in a non-random pattern, in a symmetrical pattern, or any other pattern.

Figure 10:
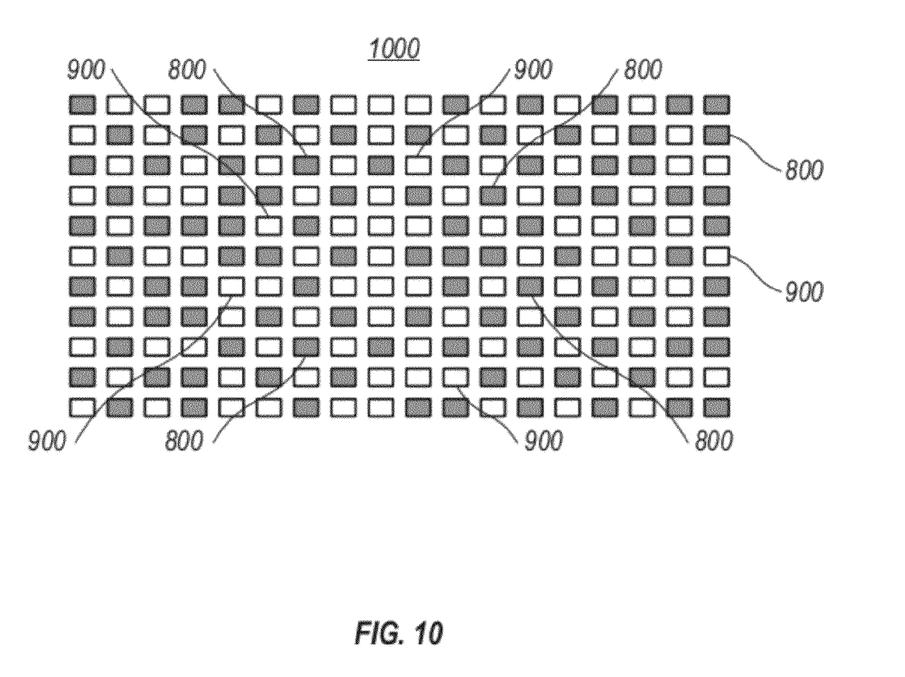
FIG. 10 is a filter array formed by a combination of the infrared filter array depicted in FIG. 8 and the visible light filter array depicted in FIG. 9 in accordance with an exemplary implementation of the present technology.

FIG. 10 is an illustration of a filter array 1000 comprising the visible light filter 315 illustrated in FIG. 9 and the infrared filter 310 illustrated in FIG. 8. As illustrated in FIG. 10, the visible light photosensor filters 900 and the infrared photosensor filters 800 are arranged in an array that corresponds to the array of photosensors of the image sensor illustrated in FIG. 4. As shown in FIG. 10, the filter array 1000 is an eleven row by eighteen column array of infrared photosensor filters 800 and visible light photosensor filters 900. However, one of ordinary skill in the art will appreciate that the filter array 1000 can have any number of rows and columns of infrared photosensor filters 800 and visible light photosensor filters 900 so long as each photosensor of the image sensor 305 is covered by one of an infrared photosensor filter 800 or a visible light photosensor filter 900.

Figure 11:
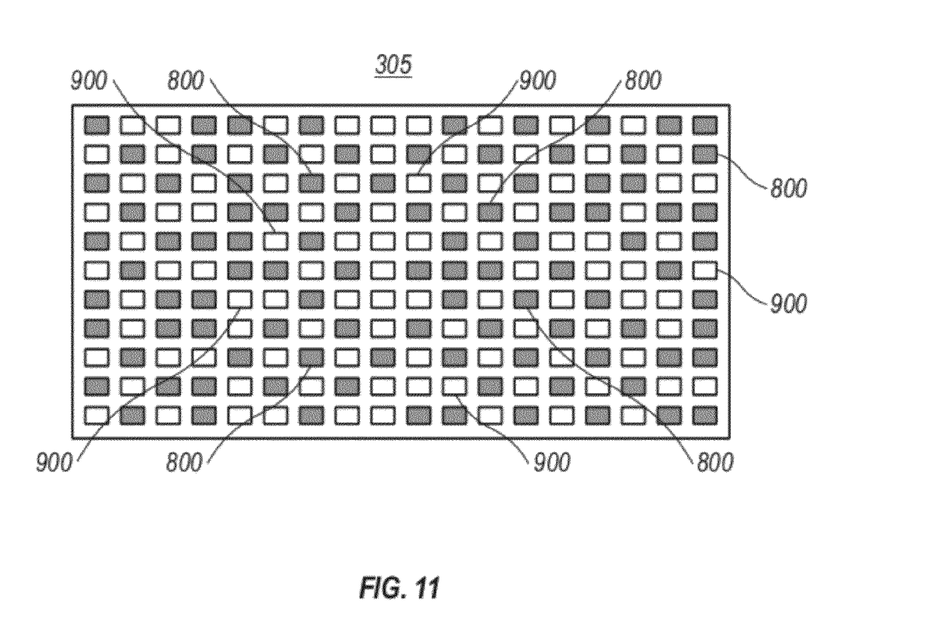
FIG. 11 is an illustration of the image sensor illustrated in FIG. 7 assembled with the filter array illustrated in FIG. 10 in accordance with an exemplary implementation of the present technology.

FIG. 11 is an illustration of the filter array 1000 illustrated in FIG. 10 arranged on the image sensor 305 illustrated in FIG. 4. As shown in FIG. 11, each of the visible light photosensor filters 900 and the infrared photosensor filters 800 each cover a photosensor 400 of the image sensor 305. In other words, each photosensor 400 is coupled to either a visible light photosensor filter 900 or an infrared photosensor filter 800. In FIG. 11, the visible light photosensor filters 900 and the infrared photosensor filters 800 can be arranged on the image sensor 305 such that at least some of the visible light photosensor filters 900 are each adjacent to an infrared photosensor filter 800 and some of the visible light photosensor filters 900 are each adjacent to another visible light photosensor filter 900. In an alternative implementation, the infrared photosensor filters 800 and the visible light photosensor filters 900 can be arranged on the photosensors 400 of the image sensor in an alternating pattern. For example, each infrared photosensor filter 800 can be arranged on the image sensor 305 such that the infrared photosensor filter 800 is adjacent to two visible light photosensor filters 900. Alternatively, each visible light photosensor filter 900 can be adjacent to two infrared photosensor filters 800.

Figure 12:
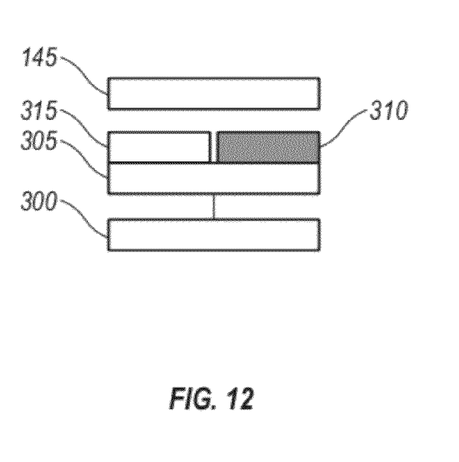
FIG. 12 is a side view of an exemplary arrangement of a lens, a visible light filter, an infrared filter, an image sensor, and a processor in accordance with an exemplary implementation of the present technology, where the visible light filter and the infrared filter are placed on a top surface of the image sensor.

FIG. 12 is an illustration of an exemplary arrangement of the visible light filter 315, the infrared filter 310, and the image sensor 305. In FIG. 12, both the visible light filter 315 and the infrared filter 310 are positioned on a front surface of the image sensor 305 such that the visible light filter 315 and the infrared filter 310 are between the image sensor 305 and the lens 1200 of the camera module. The image sensor 305 is coupled to the processor 300, which is coupled to the display (shown in FIG. 1) of the mobile device to display the captured image.

Figure 13:
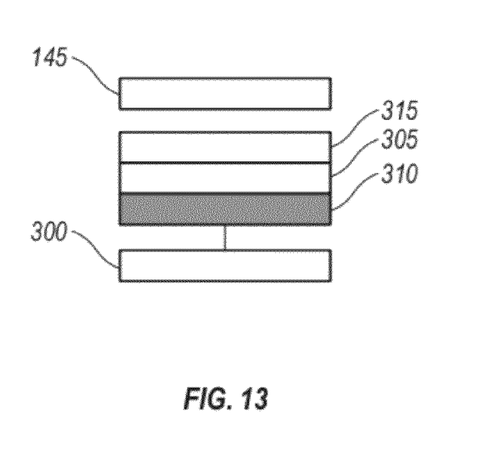
FIG. 13 is a side view of another exemplary arrangement of a lens, a visible light filter, an infrared filter, an image sensor, and a processor in accordance with an alternative exemplary implementation of the present technology, where the infrared filter are placed on a bottom surface of the image sensor.

In an alternative implementation, one of the visible light filter 315 and the infrared filter 310 can be positioned on a rear surface of the image sensor 305 such that a filter is placed between the image sensor 305 and the processor 300. For example, in FIG. 13, the visible light filter 315 is positioned on a front surface of the image sensor 305 such that the visible light filter 315 is between the camera lens 1200 and the image sensor 305, and the infrared filter 310 is positioned on a rear side of the image sensor 305, such that the infrared filter 310 is between the image sensor 305 and the processor 300. In another implementation the infrared filter 310 can be positioned between the camera lens 1200 and the image sensor 305, and the visible light filter 315 can be positioned between the image sensor 305 and the processor 300. The processor 300 is coupled to the display of the mobile device to display the captured image having infrared image data and visible light image data that result in a low-light image having enhanced brightness that maintains color accuracy.

Figure 14:
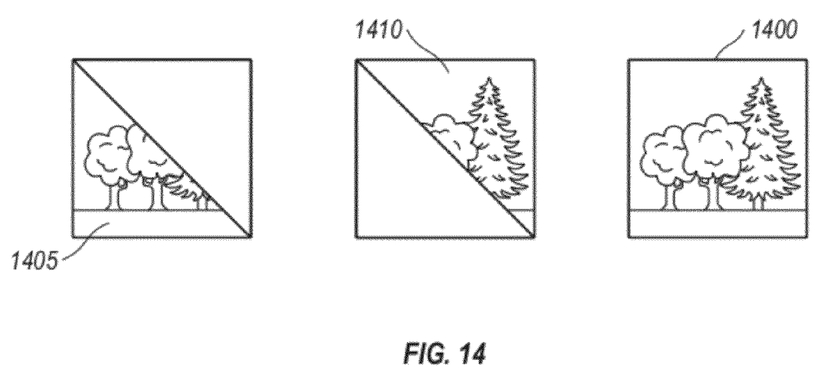
FIG. 14 is an illustration of an exemplary low-light image captured by a mobile device in accordance with the present technology where the low-light image is a composite image of infrared image data and visible light image data.

FIG. 14 is an illustration of camera data captured by the arrangement of the image sensor 305, visible light filter 315, and infrared filter 310 illustrated in FIG. 6. As the image sensor 305 is covered by triangular-shaped filters 310, 315, the resulting images captured by the image sensor are divided into camera data having a corresponding triangular shape. As the bottom-triangular half of the image sensor 305 is covered by the visible light filter 315, image sensor captures visible light data 1405 from the bottom-triangular half of the image sensor. Correspondingly, the upper-triangular half of the image sensor 305 captures infrared data 1410 as the upper-triangular half of the image sensor 305 is covered by the infrared filter 1410. The resulting image captured by the image sensor 305 and converted to electrical signals processed by the processor is a resultant image 1400 having both the visible light data 1405 and the infrared data 1410. While the illustrated implementation of FIG. 14 illustrates a resultant image data comprising triangular halves of filtered data, one of ordinary skill in the art will appreciate that the resultant image can comprises any portion of filtered data corresponding to the size and shape of the infrared filter 310 and the visible light filter 315 covering the image sensor 305. As the resultant image comprises both visible light data 1405 and infrared data 1410, the resultant image is a low-light image having enhanced brightness that does not reduce color accuracy.

Figure 15:
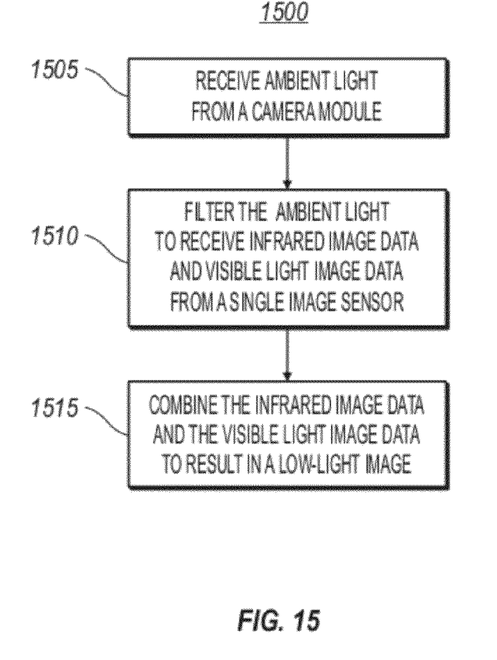
FIG. 15 is a flow chart of a method for capturing low-light images on a mobile device in accordance with an exemplary implementation of the present technology.

FIG. 15 is a flow chart of a method of capturing low-light images on a mobile device. The method 1500 comprises receiving ambient light from a camera module (block 1505). For example, ambient light can be detected and passed through the camera lens of the camera module. The ambient light can then be filtered to receive infrared image data and visible light data from the image sensor (block 1510). For example, filtering the ambient light can comprise placing an infrared filter over a first portion of the image sensor and placing a visible light filter over a second portion of the image sensor that is not covered by the infrared filter. In at least one implementation, the ambient light can pass through an infrared filter to the image sensor to receive infrared image data. Additionally, ambient light can also pass through a visible light filter to the image sensor to receive visible light data. In an alternative implementation, filtering the ambient light can comprises placing an infrared filter and a visible light filter over a single image sensor where the single image sensor comprises an array of infrared responders that are adapted to form infrared image data and an array of visible light responders that are adapted to receive visible light image data. As a result, the image data sensed by the image sensor comprises a portion of infrared image data and a portion of visible light image data.

The infrared image data and the visible light image data can be combined to result in a low-light image (block 1515). For example, with reference to FIG. 14, the visible light image data 1405 can be received from a bottom half of the image sensor, and the infrared image data 1410 can be received from a top half of the image sensor. The processor (shown in FIG. 3) can receive the infrared image data and the visible light image data, combine the infrared image data, and the visible light data, and display a resultant image 1400 on the display of the mobile device having the combined infrared image data and the visible light data. The resulting image is a low-light image that maximizes the light energy by receiving both infrared wavelengths and visible light wavelengths while maintaining the color accuracy of the scene or image being captured.

FIG. 3-15 illustrate a single image sensor 305 covered by both an infrared filter and a visible light filter. Utilizing a single image sensor maximizes the real estate within a mobile device, thereby maintaining the compact portable size and shape of a mobile device. With a single image sensor covered by both an infrared filter and a visible light filter, the processor of the mobile device can combine the image data from the image sensor covered by the infrared filter and the image data from the image sensor covered by the visible light filter to enhance the lowlight performance of the camera module without sacrificing the camera module's ability to capture colors accurately. However, while the illustrated implementations have been described with respect to a single image sensor, those of ordinary skill in the art will appreciate that more than one image sensor can be utilized. For example, the image sensor can be a two-chip scale packaged sensor, where the sensors are mounted adjacent to each other on a common substrate, thereby minimizing parallax issues.

While the system and method of capturing low-light images have been described in relation to the exemplary implementations illustrated in FIGS. 1-15, one of ordinary skill in the art will appreciate that the limitations and elements illustrated herein can be optionally included or combined with one another to achieve the technical advantages of the claimed subject matter as described herein.

Figure 16:
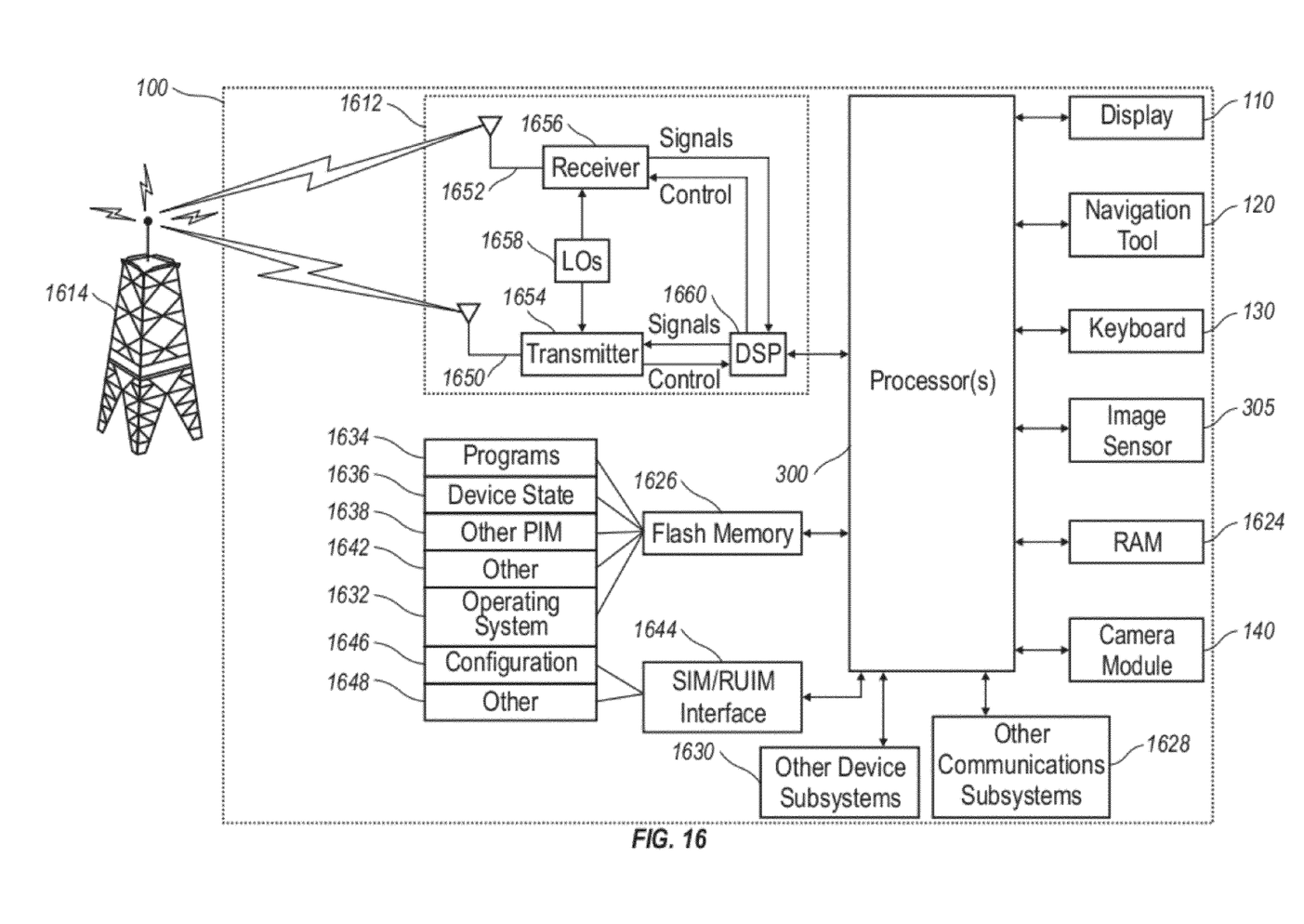
FIG. 16 is a block diagram representing a mobile device configured capturing low-light images in accordance with an exemplary implementation of the present technology.

An exemplary implementation of a mobile device 100 adapted to capture low-light images, can include components as illustrated in FIG. 16. While the components of FIG. 16 are not all inclusive, FIG. 9 illustrates components that can be included on a mobile device 100 according to the present disclosure. Additional components are required to allow the mobile device 100 to function, but have been omitted for clarity.

As illustrated in FIG. 16, the mobile device 100 includes a communication subsystem 1630 to perform all communication transmission and reception with a wireless network 1614. A processor module 300 can be connected with an auxiliary input/output (I/O) subsystem 1628 which can be coupled to the mobile device 100. The processor module 300 can include one or more processors. Additionally, the processors can be micro-processors for example. In at least one implementation, the processor module 300 can be coupled to a serial port (for example, a Universal Serial Bus port) which can allow for communication with other devices or systems. The display 110 can be coupled to the processor module 300 to allow for displaying of information to a user of the mobile device 100. When the mobile device 100 is equipped with a keyboard 130, the keyboard 130 can also be connected with the processor module 300. The mobile device 100 can include a speaker, a microphone, random access memory (RAM) 1624, and flash memory 1626, all of which can be coupled to the processor module 300. Other similar components can be provided on the mobile device 100 as well and optionally coupled to the processor module 300. Other communication subsystems 1630 and other communication device subsystems 1628 are generally indicated as being functionally connected with the processor module 300 as well. An example of the communication subsystem 1612 is that of a short range communication system such as BLUETOOTH® communication module or a WI-FI® communication module (a communication module in compliance with IEEE 802.11 set of protocols) and associated circuits and components. The processor module 300 is able to perform operating system functions and enables execution of programs on the mobile device 100. In some implementations not all of the above components can be included in the mobile device 100.

The auxiliary I/O subsystem 1660 can take the form of a trackpad navigation tool, or a trackball, a thumbwheel, a navigation pad, a joystick, touch-sensitive interface, or other I/O interface. While the above examples have been provided in relation to the auxiliary I/O subsystem 1660, other subsystems capable of providing input or receiving output from the mobile device 100 are considered within the scope of this disclosure. Other keys can be placed along the side of the mobile device 100 to function as escape keys, volume control keys, scrolling keys, power switches, or user programmable keys, and can likewise be programmed accordingly.

Furthermore, the mobile device 100 is equipped with components to enable operation of various programs, as shown in FIG. 16. For example, such a program can be a computer application programmed to determine location-based preferred media files or to retrieve directions and maps associated with the current position of the mobile device 100. In an exemplary implementation, the flash memory 1626 is enabled to provide a storage location for the operating system 1632, device programs 1634, and data. The operating system 1632 is generally configured to manage other programs 1642 that are also stored in memory 1626 and executable on the processor 300. The operating system 1632 honors requests for services made by programs 1634 through predefined program 1634 interfaces. More specifically, the operating system 1626 typically determines the order in which multiple programs 1634 are executed on the processor 300 and the execution time allotted for each program 1634, manages the sharing of memory 1626 among multiple programs 1634, handles input and output to and from other device subsystems 1630, and so on. In addition, users can typically interact directly with the operating system 1632 through a user interface which can include the keyboard 130 and display screen 110. While in an exemplary implementation the operating system 1632 is stored in flash memory 1626, the operating system 1632 in other implementations is stored in read-only memory (ROM) or similar storage element (not shown). As those skilled in the art will appreciate, the operating system 1632, device program 1634 or parts thereof can be loaded in RAM 1624 or other volatile memory.

In one exemplary implementation, the flash memory 1626 contains programs 1634 for execution on the mobile device 100 including an address book 936, a personal information manager (PIM) 1638, and the device state 1640. Furthermore, programs 1634 and other information 1648 including data can be segregated upon storage in the flash memory 1626 of the mobile device 100.

When the mobile device 100 is enabled for two-way communication within the wireless communication network 1614, the mobile device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 1614. Other systems may not require such identifying information. GPRS, UMTS, and EDGE use a Subscriber Identity Module (SIM) in order to allow communication with the communication network 1614. Likewise, most CDMA systems use a Removable User Identity Module (RUIM) in order to communicate with the CDMA network. The RUIM and SIM card can be used in multiple different mobile devices 100. The mobile device 100 can be able to operate some features without a SIM/RUIM card, but the mobile device will not be able to communicate with the network 1614. A SIM/RUIM interface 1644 located within the mobile device 100 allows for removal or insertion of a SIM/RUIM card (not shown). The SIM/RUIM card features memory and holds key configurations 1646, and other information 1648 such as identification and subscriber related information. With a properly enabled mobile device 100, two-way communication between the mobile device 100 and communication network 1614 is possible.

If the mobile device 100 is enabled as described above or the communication network 1614 does not require such enablement, the two-way communication enabled mobile device 100 is able to both transmit and receive information from the communication network 1614. The transfer of communication can be from the mobile device 100 or to the mobile device 100. In order to communicate with the communication network 1614, the mobile device 100 in the presently described exemplary implementation is equipped with an integral or internal antenna 1650 for transmitting messages to the communication network 1614. Likewise the mobile device 100 in the presently described exemplary implementation is equipped with another antenna 1652 for receiving communication from the communication network 1614. These antennae (1652, 1650) in another exemplary implementation are combined into a single antenna (not shown). As one skilled in the art would appreciate, the antenna or antennae (1652, 1650) in another implementation are externally mounted on the mobile device 100.

When equipped for two-way communication, the mobile device 100 features the communication subsystem 1612. As is understood in the art, the communication subsystem 1612 is modified so that the subsystem 1612 can support the operational needs of the mobile device 100. The subsystem 1612 includes a transmitter 1654 and receiver 1656 including the associated antenna or antennae (1652, 1650) as described above, local oscillators (LOs) 1658, and a processing module which in the presently described exemplary implementation is a digital signal processor (DSP) 1660.

The present disclosure contemplates that communication by the mobile device 100 with the wireless network 1614 can be any type of communication that both the wireless network 1614 and mobile device 100 are enabled to transmit, receive and process. In general, these can be classified as voice and data. Voice communication generally refers to communication in which messages for audible sounds are transmitted by the mobile device 100 through the communication network 1614. Data generally refers to all other types of communication that the mobile device 100 is capable of performing within the constraints of the wireless network 1614.

Example device programs that can depend on such data include email, contacts and calendars. For each such program, synchronization with home-based versions of the programs can be desirable for either or both of the program's long term and short term utility. As an example, emails are often time sensitive, so substantially real time synchronization can be desired. Contacts, on the other hand, can be usually updated less frequently without inconvenience. Therefore, the utility of the mobile device 100 is enhanced when connectable within a communication system, and when connectable on a wireless basis in the network 1614 in which voice, text messaging, and other data transfer are accommodated.

Even more, the present technology can take the form of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Those of skill in the art will appreciate that other implementations of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Implementations may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk, an optical disk, and non-transitory memory. Current examples of optical disks include compact disk-read only memory (CD-ROM), compact disk-read/write (CD-R/W), DVD, and Blu Ray™

Implementations within the scope of the present disclosure may also include tangible and/or non-transitory computer-readable storage media for carrying or having computer-executable instructions or data structures stored thereon. Additionally, non-transitory memory also can store programs, device state, various user information, one or more operating systems, device configuration data, and other data that may need to be accessed persistently. Further, non-transitory computer-readable storage media expressly exclude media such as energy, carrier signals, electromagnetic waves, and signals per se. Such non-transitory computer-readable storage media can be any available media that can be accessed by a general purpose or special purpose computer, including the functional design of any special purpose processor as discussed above. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Both processors and program code for implementing each medium as an aspect of the technology can be centralized or distributed (or a combination thereof) as known to those skilled in the art.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, Wi-Fi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

One of ordinary skill in the art will appreciate that the features in each of the figures described herein can be combined with one another and arranged to achieve the described benefits of the presently disclosed system and method of capturing low-light images on a mobile device. Additionally, one of ordinary skill will appreciate that the elements and features from the illustrated implementations herein can be optionally included to achieve the described benefits of the presently disclosed system and method of capturing low-light images on a mobile device. Various modifications to and departures from the disclosed implementations will occur to those having skill in the art.

What is claimed is:

1. A mobile device comprising:
a camera module;
an image sensor adapted to detect a color spectrum of ambient light passed into the camera module;
an infrared filter coupled to the image sensor;
a visible light filter coupled to the image sensor;
a processing module coupled to the image sensor, the visible light filter, and the infrared filter, wherein the processing module is adapted to receive color spectrum data from the image sensor comprising infrared data and visible light data, said infrared data comprising ambient light passed into the camera module and filtered through the infrared filter, and said visible light data comprising ambient light passed into the camera module and filtered through the visible light filter; and
a display coupled to the processing module and adapted to display the color spectrum data;
wherein the infrared filter covers a first portion of the image sensor and the visible light filter covers a second portion of the image sensor; and
the first portion is one-half of the image sensor and the second portion is one-half of the image sensor.

2. The mobile device of claim 1, wherein the image sensor comprises a plurality of photosensors, each photosensor being responsive to ambient light filtered through at least one of the infrared filter and the visible light filter.

3. The mobile device of claim 2, wherein the infrared filter is an array of infrared photosensor filters, and each infrared photosensor filter covers one of the plurality of photosensors of the image sensor.

4. The mobile device of claim 2, wherein the visible light filter is an array of visible light photosensor filters, and each visible light photosensor filter covers one of the plurality of photosensors of the image sensor.

5. The mobile device of claim 1, wherein the infrared filter and the visible light filter form a filter array comprising a plurality of infrared photosensor filters and a plurality of visible light photosensor filters.

6. The mobile device of claim 5, wherein the visible light photosensor filters and the infrared photosensor filters are arranged on the image sensor such that at least some of the visible light photosensor filters are adjacent to an infrared photosensor filter and some of the visible light photosensor filters are adjacent to another visible light photosensor filter.

7. The mobile device of claim 1, wherein at least one of the visible light filter and the infrared filter is positioned on a rear surface of the image sensor.

8. The mobile device of claim 1, wherein at least one of the visible light filter and the infrared filter is positioned on a front surface of the image sensor.

9. The mobile device of claim 1, wherein the visible light filter is adapted to filter at least one of a red color, a green color, a blue color, and a yellow color from the color spectrum of ambient light passed into the camera module.

10. The mobile device of claim 1, wherein the image sensor is a single image sensor coupled to both the infrared filter and the visible light filter.

11. The mobile communication device of claim 1, wherein the infrared filter and the visible light filter are positioned between the lens and the image sensor.

12. A camera module for a mobile device, the camera module comprising:
a lens;
an image sensor adapted to detect a color spectrum of ambient light passed into the lens;
an infrared filter coupled to the image sensor; and
a visible light filter coupled to the image sensor;
wherein the image sensor, the visible light filter, and the infrared filter are configured to be communicatively coupled to a processor module adapted to:
receive color spectrum data from the image sensor comprising infrared data and visible light data, said infrared data comprising ambient light passed into the lens and filtered through the infrared filter and said visible light data comprising ambient light passed into the lens and filtered through the visible light filter; and
display the color spectrum data on a display of the mobile device; and
wherein the infrared filter covers a first portion of the image sensor and the visible light filter covers a second portion of the image sensor; and
the first portion is one-half of the image sensor and the second portion is one-half of the image sensor.

13. The camera module of claim 12, wherein:
the image sensor comprises a plurality of photosensors, each photosensor being receptive to at least one of the infrared filter and the visible light filter;
the infrared filter is an array of infrared photosensor filters, each infrared photosensor filter covering one of the plurality of photosensors of the image sensor; and
the visible light filter is an array of visible light photosensor filters, each visible light photosensor filter covering one of the plurality of photosensors of the image sensor not covered by one of the infrared photosensor filters.

14. A method for generating a low-light image, the method comprising:
receiving ambient light from a camera module;
filtering the ambient light to receive infrared image data and visible light image data from a single image sensor of the camera module;
combining the infrared image data and the visible light image data to result in the low-light image;
wherein filtering the ambient light comprises placing an infrared filter over a first portion of the single image sensor and a visible light filter over the second portion of the single image sensor; and
the first portion is one-half of the image sensor and the second portion is one-half of the image sensor.

* * * * *